Patented Oct. 24, 1922.

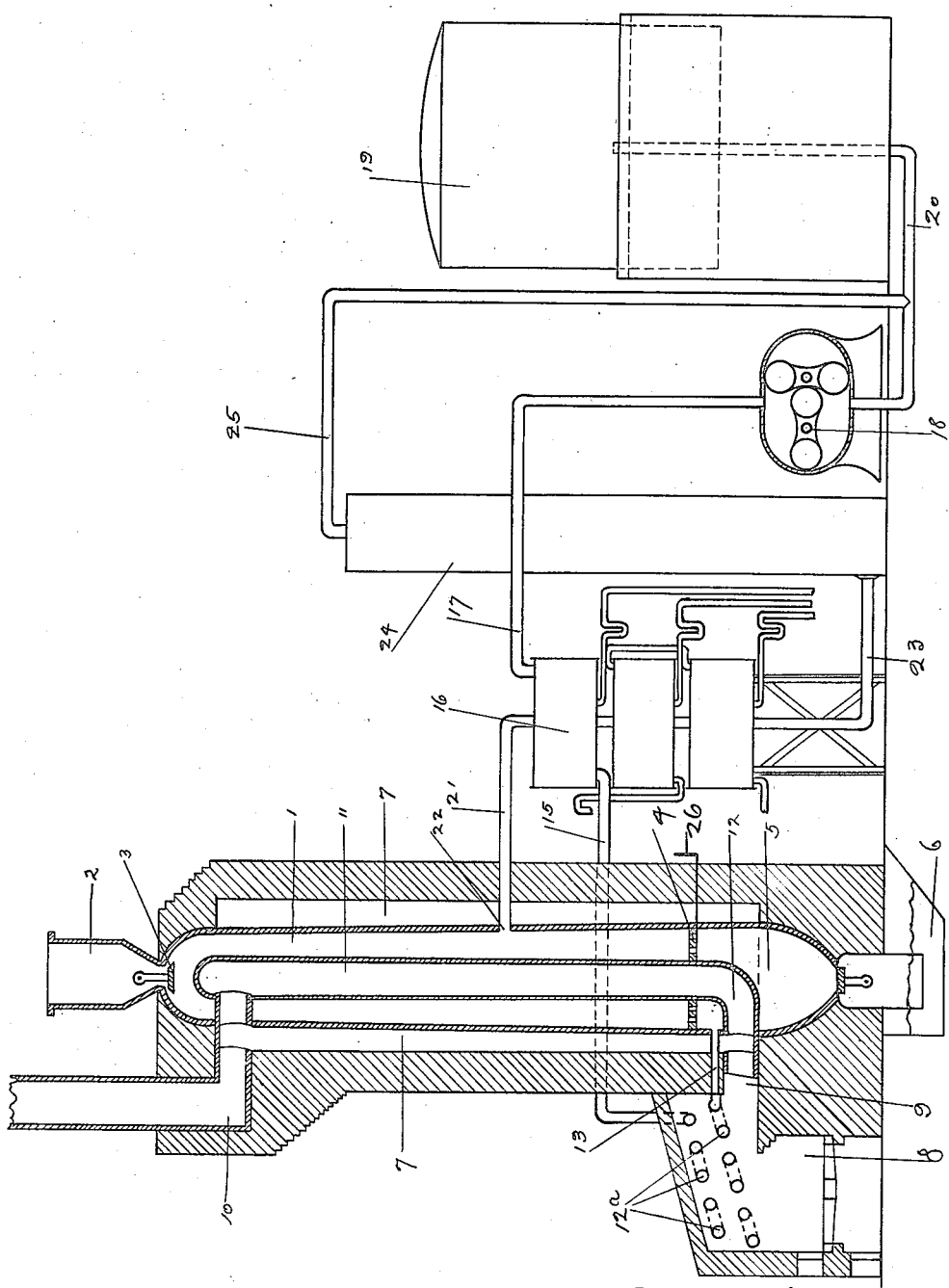

1,433,051

UNITED STATES PATENT OFFICE.

WILLET C. WELLS AND FRANK E. WELLS, OF COLUMBUS, OHIO.

PROCESS OF OBTAINING OILS, PITCH, AND THE LIKE FROM SHALES, COAL, WOOD, AND OTHER MATERIALS.

Application filed August 30, 1919. Serial No. 320,850.

*To all whom it may concern:*

Be it known that we, WILLET C. WELLS and FRANK E. WELLS, citizens of the United States, residing at Columbus, in the county of Franklin and State of Ohio, have invented certain new and useful Improvements in Processes of Obtaining Oils, Pitch, and the like from Shales, Coal, Wood, and Other Materials, of which the following is a specification.

Our invention is a process of obtaining oil and the like from shale and other substances, and is applicable to the distillation of volatile products from shale, coal, wood and other non-fluid materials.

Shales in their natural state contain no oil or other volatile matter in their composition, and the volatile matter obtained therefrom is the product of their decomposition by heat; as this distillation has usually been carried on, secondary decomposition of the volatile products has been caused by the high degree of heat necessary to effect the initial decomposition of the materials operated upon, and this has not been avoided by the use of superheated steam. Consequently, in the distillation of shales and the like, a quantity of fixed gas, a limpid and unctuousless condensate of the vapors, a reduced quantity and quality of wax and a large quantity of carbon, have been produced.

Applicants win volatile matter from shale and the like with its constitution practically unimpaired, by the use of an annular column retort, in which a thin ring of broken shale receives heat through both outer and inner walls thereof from an enveloping body of gases of combustion from a furnace appropriately located; a large volume of heated gas is introduced at the bottom of the column of shale and passes upwardly therethrough. The gas thus introduced thereinto performs the double office of evenly distributing heat through the shale, and, because of its avidity for the vapors, extracts the volatile portion of the shale as soon as formed and conveys it away without subjecting it to higher temperature than the heat required for its formation. Therefore we recover or extract the vapors near the lower end of the column through the co-operative action of the heated gases on the outside and the highly heated absorptive gases on the inside, and convey away these vapors before they may be subjected to the further heat decomposing the shale, whereby, as stated, they would undergo a secondary decomposition.

Referring to the drawings, 1 is a vertical annular column or receptacle having the hopper 2 at the top thereof, and the check valve 3; at the bottom of the column is the grate 4 arranged to be dumped; beneath the grate is a bowl 5 into which the refuse from the column is dumped, whence it passes downwards into the receptacle 6. An annular space 7 surrounds the column and at its lower end is in communication with the furnace 8 through the passage 9, and the heated gases from the furnace rush up through the annular space, completely enveloping the column, and find their way out through the exit or flue 10 at the top. The chimney 11 within the annular column is in communication with the furnace through the passage 12 and at the top communicates with the flue 10. Overlying the furnace 8 is a series of gas heating pipes 12$^a$ communicating through passage 13 with the bowl shaped compartment 5 whence the gas passes up through the grated bottom of the column 1 into the materials there undergoing treatment.

The gas is conducted to the series of pipes 12$^a$ through the conduit 15 from the condenser 16, connected by conduit 17 with the pump 18 which is in communication with the gas holder 19 through conduit 20.

Vapor line 21 taps into the annular column 1 at 22, and leads to the condensers 16 and after passing therethrough the non-condensible portion of the gas issues through conduit 23 into the scrubbing tower 24 connecting by pipe 25 with the gas holder 19 and with the pump. 18.

In operation the annular column 1 is filled with broken shale, coal or other materials to be treated through the gas tight hopper 2 and the valve 3, and as needed in the carrying out of the process the supply in the column is replenished. Heat from the furnace 8 flows out into the bowl shaped compartment 5 and upwardly into the annular space 7 surrounding the column and into the chimney 11 enclosed within the column, and so completely surround the shale or other material in the column and is transferred to the material through the walls and the spent products of combustion issue from the flue 10. Gas is pumped from the holder 19 into the condenser, where it receives heat from the vapors condensed therein, and passes into the gas pipes 12ª overlying the furnace 8, where it is heated to the degree desired as it is circulated through the series, and then passes through the pipe 13 into the bowl shaped compartment 5 whence it passes upwardly through the grated bottom of the column 1 into the mass of shale or other material being treated therein, and completely permeates and enwraps the individual particles thereof, rendering their heat uniform, and by its absorptive power extracting their vapors in the early stages of their formation, thus avoiding decomposition of the vapors, and quickly removing them. They are conveyed through the conduit or vapor line 21 to the condenser 16, where the vapors are separated into their different grades from the gas in which they are borne.

The heated gas which we use is avid or greedy, and as its heat is increased its avidity or thirst to saturate itself with vapors is greatly increased, and as the large volume used is highly heated in the series of tubes or pipes overlying the furnace, its thirst is at maximum when it is introduced into the lower end of the column or receptacle filled with the shale or other material, and its absorptive properties immediately manifest themselves in extracting vapors from within the shale or other particles. The vapors pass out from the column 1 at a comparatively low point thereof, as seen at 22, wherefore the products of combustion of the furnace spend a great portion of their efficiency above the take off 22 in heating the constantly incoming quantity of shale or other material.

The remaining material from which the vapors have been extracted as stated, is drawn off at the bottom through the grate 4 by the action of the shaker or slide 26, which may be actuated by hand or mechanically, as desired, and drops into the bowl 5 and so passes down into the receptacle 6. The non-condensible portion of the gas issuing from the condenser passes through the scrubber and thence into the holder or is pumped back into the service as described above.

What we claim is:

1. The process of extracting volatile matter from shale and the like consisting in charging an annular retort continuously with the shale, heating the shale by applying to both surfaces of said retort the gases of combustion, introducing a neutral heated gas into the body of said shale at the lower end of said retort, and conveying the vapors from said retort approximately at the point of their extraction.

2. The process of extracting volatile matter from shale and the like consisting in applying heat to the shale through the walls of an annular container or retort, introducing highly heated gas into the body of the shale at its lower end to produce even distribution of heat throughout the shale and to extract the vapors therefrom upon the initial decomposition of the shale, and conveying away the vapors from the retort before secondary decomposition thereof can set in.

3. The process of distilling oil from shale consisting of placing shale in a retort of annular columnar form, in applying heat of gases of combustion to both faces thereof from beneath, introducing a volume of highly heated neutral gas from beneath into the body of the shale to effect an even distribution of the heat therethrough and to search out the vapors produced by the initial decomposition of the shale, and carrying said vapors away from said retort approximately at the point of their formation.

4. The process of extracting volatile matter in vapors from shale, coal, wood and other materials at low temperatures, and thereby converting coal into coke, consisting in charging an annular retort with the material to be operated upon, heating the charge therein through both exterior and interior walls of the retort by enveloping the outer wall with the direct products of combustion from the furnace, and passing similar hot gases through the interior of the retort, and passing neutral heated gas through the lower portion of the heated materials to equalize the heat therein and extract and carry out the vapors therefrom, to a condenser.

In testimony whereof we affix our signatures in the presence of two witnesses.

WILLET C. WELLS.
FRANK E. WELLS.

Witnesses:
   JAMES E. BAUMAN,
   GEO. W. RIGHTMIRE.